US012712221B2

(12) United States Patent
Antenucci et al.

(10) Patent No.: US 12,712,221 B2
(45) Date of Patent: Aug. 18, 2026

(54) METHOD FOR EXCHANGING HEAT WITH A BATTERY USING FLUORINATED COMPOUNDS HAVING A LOW GWP

(71) Applicant: SYENSQO SPECIALTY POLYMERS ITALY S.p.A, Bollate (IT)

(72) Inventors: Emanuela Antenucci, Saronno (IT); Letanzio Bragante, Due Carrare (IT); Valeriy Kapelyushko, Alessandria (IT); Stefano Millefanti, Tradate (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 1123 days.

(21) Appl. No.: 17/311,026

(22) PCT Filed: Dec. 19, 2019

(86) PCT No.: PCT/EP2019/086211
§ 371 (c)(1),
(2) Date: Jun. 4, 2021

(87) PCT Pub. No.: WO2020/127665
PCT Pub. Date: Jun. 25, 2020

(65) Prior Publication Data

US 2022/0021051 A1 Jan. 20, 2022

(30) Foreign Application Priority Data

Dec. 20, 2018 (EP) .................................... 18214416

(51) Int. Cl.
*H01M 10/6567* (2014.01)
*C09K 5/10* (2006.01)
*H01M 10/0525* (2010.01)

(52) U.S. Cl.
CPC ........... *H01M 10/6567* (2015.04); *C09K 5/10* (2013.01); *H01M 10/0525* (2013.01); *H01M 2220/20* (2013.01)

(58) Field of Classification Search
CPC ........... C09K 5/00; C09K 5/045; C09K 5/10; H01M 2220/20
See application file for complete search history.

(56) References Cited

U.S. PATENT DOCUMENTS 5,547,593 A * 8/1996 Sanechika .......... C10M 171/008 508/435
5,713,211 A 2/1998 Sherwood
2004/0137313 A1* 7/2004 Jaura ..................... H01M 10/63 429/62
2005/0065382 A1* 3/2005 Petrov ................... H10K 71/15 568/664
2005/0151110 A1 7/2005 Minor et al.
2007/0187639 A1 8/2007 Leck et al.
2009/0176148 A1 7/2009 Jiang et al.
2009/0197167 A1* 8/2009 Olschimke ........ H01M 10/0567 429/188
2013/0177786 A1* 7/2013 Prochazka, Jr. .... H01M 10/052 429/82
2014/0322656 A1* 10/2014 Wright .................... G03F 7/422 430/325
2015/0331325 A1 11/2015 Defranco et al.

FOREIGN PATENT DOCUMENTS

WO 2001014809 A1 3/2001
WO 2007099055 A2 9/2007
WO 2010034698 A1 4/2010

OTHER PUBLICATIONS

Nagasubramanian, G., & Orendorff, C. J., Hydrofluoroether electrolytes for lithium-ion batteries: Reduced gas decomposition and nonflammable, 2011, Journal of Power Sources, 196(20), pp. 8604-8609 (Year: 2011).*
McBee, E. and Bolt, R., 1947. Fluorinated ethers. Industrial & Engineering Chemistry, 39(3), pp. 412-415. (Year: 1947).*
Hodnebrog Ø. et al., "Global warming potentials and radiative efficiencies of halocarbons and related compounds: A comprehensive review", Review of Geophysics, 2013, vol. 51, p. 300-378.

* cited by examiner

*Primary Examiner* — Jonathan G Leong
*Assistant Examiner* — Aryana Y. Ortiz
(74) *Attorney, Agent, or Firm* — Osha Bergman Watanabe & Burton LLP

(57) ABSTRACT

The present invention relates to a method for exchanging heat with a battery comprising the use of a heat transfer fluid, which comprises one or more chemical compounds having the general formula: $Ph(OR_f)_x$ (I) wherein Ph is an aromatic ring linked to one or more ether groups —$OR_f$ where each —$R_f$: —is a monovalent fluorinated alkyl group comprising at least one C—F bond, —has a carbon chain, preferably a $C_1$-$C_{10}$ carbon chain, which can be linear or can comprise branches and/or cycles, and, optionally, can comprise in chain heteroatoms selected from O, N or S, and wherein, when X>1, the —$R_f$ groups on the same molecule can be equal to or different from each other.

15 Claims, No Drawings

METHOD FOR EXCHANGING HEAT WITH A BATTERY USING FLUORINATED COMPOUNDS HAVING A LOW GWP

TECHNICAL FIELD

This application is a U.S. national stage entry under 35 U.S.C. § 371 of International Application No. PCT/EP2019/086211 filed Dec. 19, 2019, which claims priority to EP Application Serial No. 18214416.2, filed on 20 Dec. 2018. The entire contents of these applications are explicitly incorporated herein by this reference.

The present invention relates to a method for exchanging heat with a battery using compositions comprising selected fluorinated compounds having low GWP as heat transfer fluids.

BACKGROUND ART

Rechargeable batteries of high power and/or capacity are currently getting a lot of attention in the industry: new and more powerful models are continuously developed enabling their use in applications where previously only traditional fuels or grid electricity could be used e.g. power computing, power tools and vehicles. The vehicle segment in particular, being the focus of large investments in electric and hybrid models, is especially driving the development of new and more powerful batteries.

Currently, most of the development in the field of rechargeable batteries, in all industry segments, is focused on Lithium-ion based batteries which are based on different types of lithium salts. Batteries based on Lithium Manganese Oxide, Lithium Iron Phosphate and Lithium Nickel Manganese Cobalt Oxide find application e.g. in vehicles, power tools, e-bikes, and the like. Batteries based on Lithium Cobalt Oxide are typically used in smaller sizes and less intensive applications such as cell phones, portable computers and cameras. Batteries based on Lithium Nickel Cobalt Aluminum Oxide and Lithium Titanate are being considered in applications requiring high power and/or capacity such as electric powertrain and grid storage. Naturally also new technologies, outside the realm of Lithium-ion based batteries, are being explored and continuously developed. The present invention is not linked to a particular battery technology and is applicable to both current and future generations of battery systems.

Differently from conventional power systems, batteries, and in particular rechargeable batteries, have strict requirements for their working environment. Batteries tend to operate in the best conditions within a relatively narrow range of temperatures. On the other hand, the practical applications of batteries requires them to be efficient in a much broader range of temperatures. For example vehicles batteries need to function properly in any environment where people is expected to use them, so that they need to be operative in a temperature range from −20° C. to +40° C. and beyond. In addition to that, charge and discharge cycles of batteries can generate heat within the battery itself making it even more difficult to maintain the battery within an acceptable temperature range.

For this reason it is nowadays standard to integrate a Battery Thermal management System (BTMS) within commercial battery assemblies, especially when safety, reliability and lifetime of the battery are a significant concern. These BTMSs can be more or less complex, depending on the type of battery, however one common element is the presence of a heat transfer fluid such as a gas or a liquid which exchanges heat with the battery thus heating or cooling it.

Heat transfer fluids are used to transfer heat from one body to another, typically from a heat source to a heat sink so as to effect cooling of the heat source, heating of the heat sink or to remove unwanted heat generated by the heat source. The heat transfer fluid provides a thermal path between the heat source and the heat sink; it may be circulated through a loop system or other flow system to improve heat flow or it can be in direct contact with heat source and heat sink. Simpler systems use simply an airflow, as heat transfer fluid, more complex system use specifically engineered gases or liquids which are heated or refrigerated in a portion of the system and then are delivered in thermal contact with the battery to exchange heat with it.

A variety of heat transfer fluids exists which are used industrially in various application, however the choice of an appropriate fluid can be critical in some applications. Several of the heat transfer fluids commonly used in the past are no longer viable because of their toxicity (ammonia, ethylene glycol), others have been phased out due to their environmental profile because they are not biodegradable and/or because they are considered to be detrimental to the earth ozone layer and/or to act as greenhouse gases if dispersed in the environment.

Fluorinated liquid fluids are very effective heat transfer fluids. Commercial products exist such as Solvay's Galden and 3M's Fluorinert: these are liquid polymers which are dielectric, have a high heat capacity, a low viscosity and are non-toxic and chemically inert so they do not interact with the materials of the battery nor with its electronics. A drawback associated with these fluorinated fluids used so far is their high GWP value.

GWP (Global Warming Potential) is an attribute which can be determined for a given chemical compound which indicates how much heat a given greenhouse gas can entrap in the atmosphere (considering "1" as the reference value for $CO_2$) and is calculated over a specific interval of time, typically 100 years ($GWP_{100}$).

The determination of $GWP_{100}$ is performed by combining experimental data concerning the atmospheric lifetime of the chemical compound and its radiative efficiency with specific computational tool which are standard in the art and are described e.g. in the extensive review published by Hodnebrog et. Al. in Review of Gephisics, 51/2013, p 300-378. Highly stable halogenated molecules such as $CF_4$ and chloro/fluoro alkanes have a very high $GWP_{100}$ (7350 for $CF_4$, 4500 for CFC-11).

Over the years heat transfer fluids having elevated values of GWP (such as the chloro/fluoro alkanes used in air conditioning systems) have been phased out by the industry and replaced with compounds having a lower $GWP_{100}$ value and there is still a continuous interest in heat transfer fluids having $GWP_{100}$ values which are as low as possible.

Hydrofluoroethers, in particular segregated hydrofluoroethers, tend to have relatively low $GWP_{100}$ values while the rest of their properties can be compared to those of the CFCs used in the past, for this reason some hydrofluoroethers have been used industrially and gained popularity as heat transfer fluids and are marketed e.g. by 3M under the trade name "Novec®".

Hydrofluoroethers are broadly described as heat transfer media due to their wide temperature range where they are liquid, and due to their low viscosity in a broad range of temperatures which makes them useful for applications as low temperature secondary refrigerants for use in secondary loop refrigeration systems where viscosity should not be too high at operating temperatures.

Fluorinated ethers are described for example by 3M in U.S. Pat. No. 5,713,211, by Dupont in US 2007/0187639 and by Solvay Solexis in WO 2007/099055 and WO2010034698.

However, while much lower than CFCs, the $GWP_{100}$ of segregated hydrofluoroethers is still in a range from 70 to 500 as shown in U.S. Pat. No. 5,713,211 (table 5):

| | $GWP_{100}$ |
|---|---|
| $C_4F_9$—O—$CH_3$ | 330 |
| $C_4F_9$—O—$C_2H_5$ | 70 |
| c-$C_6F_{11}$—O—$CH_3$ | 170 |

Other hydrofluoro-olefins have been commercialized as heat transfer fluids e.g. by Chemours (Opteon™) and Honeywell (Solstice™). These compounds have a very low GWP, around 1, but, differently from the formerly cited compounds, are much more flammable and therefore this limits their field of use.

Therefore there is still a need for effective heat transfer fluids for use in BTMSs to exchange heat with the battery which have good dielectric properties, are liquid in a broad range of temperatures, are non flammable and have very low $GWP_{100}$ (30 and below).

SUMMARY OF INVENTION

The present invention relates to method for exchanging heat with a battery wherein said method comprises the use of a heat transfer fluid which comprises one or more chemical compounds having the general formula:

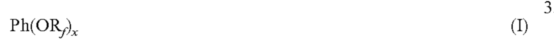

$$Ph(OR_f)_x \quad (I)$$

wherein Ph is an aromatic ring linked to one or more ether groups —$OR_f$ wherein each —$R_f$ is a monovalent fluorinated alkyl group comprising at least one C—F bond, having a carbon chain which can be linear or can comprise branches and/or cycles, and, optionally, can comprise in chain heteroatoms selected from O, N or S, and wherein, when X>1, the —$R_f$ groups on the same molecule can be equal or different from each other.

DESCRIPTION OF EMBODIMENTS

As mentioned above rechargeable batteries operate in optimal condition within a relatively narrow range of temperatures. In general low temperatures have an effect on the battery chemistry slowing down the reaction rate and therefore reducing the electricity flow when charging or discharging. High temperatures increase the reaction rate and at the same time also increase energy dissipation thus generating even more excess heat possibly causing an uncontrolled increase of Temperature which can cause irreversible damage to the cell. For a typical Li-ion battery a temperature above 80° C., even only in a part of its structure, can start exothermal chemical reactions which cause a further temperature increase of the battery, ultimately leading to a complete collapse of the battery with risk of fire and explosion.

For these reasons it is extremely important to control the operating temperature of batteries within well-defined temperature limits to ensure safe operation, longer life and optimal performance. Indicative figures for a typical Li-ion battery suggest that the usable range is normally from −20° C. to 60° C., but a good power output is only obtained from 0° C. to 40° C., where optimal performance is only obtainable from 20° to 40° C. Temperature also affect battery duration, in fact the number of charge/discharge cycles a battery can withstand before being considered exhaust go down quickly below 10° C. due to anode plating, and above 60° C. due to the deterioration of the electrode materials. The temperature ranges for optimal performance may be different for different battery chemistries and constructions, however all current commercial batteries share a relatively narrow temperature window where their performance is optimal. It is also important in general to ensure that the entire battery is kept uniformly at the same temperature without hot or cold zones, as this can reduce its lifetime and safety.

Battery thermal management systems (BTMSs) are therefore extremely important, especially in applications requiring high power, and high reliability such as vehicles batteries. A BTMS can be more or less complex, depending on the application, but each BTMS has at least a function to cool the battery when its temperature is too high and a function to heat the battery when its temperature is too low, typically using a heat transfer fluid which exchanges heat with the battery. Other common features in BTMSs are an insulation system, to reduce the effect of the external environment on the battery temperature, and a ventilation system which helps dissipating hazardous gases which may develop within the battery pack. However the method of the present invention relates specifically to the heat exchange function of a BTMS and can be applied easily to any BTMS and integrated with its other functions and features.

BTMSs using a liquid as heat transfer fluid are common because liquids can transfer a larger amount of heat more quickly than gases. Typically the fluid is circulated by a pump within a closed system which is in thermal contact with the battery and with second system which has the function of heating and/or cooling the fluid to the desired temperature. This second system may comprise any combination of a refrigeration system and a heating system or may combine heating and cooling functions in a heat pump. The circulating fluid absorbs heat from or release heat to the battery and then it is circulated in said second system to bring the fluid back to the desired temperature. A more or less sophisticated control system may be present controlling the instant temperature of the fluid and the temperature of the battery optimizing the fluid temperature in each moment.

In some systems the fluid which is circulated in the system can go in direct contact with the battery cells which are then immersed in it. Clearly in these cases the fluid must be dielectric in order to protect the battery cells and their electronic components. In other cases the heat transfer fluid is circulated in a separate closed system which only exchanges heat by indirect contact trough e.g. a heat exchange plate made of metal or other thermally conductive material. A dielectric fluid may be beneficial also in this type of systems because closed systems have anyway a high risk of leakages.

As mentioned in the introduction, dielectric fluids used in this fields include fluorocompounds. In particular hydrofluoroethers have found application in this field due to their chemical inertness, dielectricity, wide range of T in which they are liquid and pumpable (typically having a viscosity between 1 and 50 cps at the temperatures of use), low flammability and relatively low GWP.

Commercially available hydrofluoroethers for use in this field are e.g. those from the Novec™ series of 3M which combine all these properties with a relatively low $GWP_{100}$ of from about 70 to 300.

Still, GWP is a critical property nowadays, especially in highly regulated industries such as automotive. In these industries the international regulation tend to consider the environmental impact of the vehicle as a whole so that there is always a demand to develop new fluids which can be used in a BTMS which have even lower GWP than then currently commercialized hydrofluoroethers.

The present invention in fact relates to a method for exchanging heat with a battery, the method comprising the use of a heat transfer fluid which comprises one or more chemical compounds having the general formula:

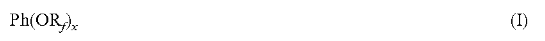

$$Ph(OR_f)_x \quad (I)$$

wherein Ph is an aromatic ring linked to one or more ether groups —$OR_f$ wherein each —$R_f$ is a monovalent fluorinated alkyl group comprising at least one C—F bond, and having a carbon chain which can be linear or can comprise branches and/or cycles, and, optionally, can comprise in chain heteroatoms selected from O, N or S, and wherein, when X>1, the —$R_f$ groups on the same molecule can be equal to or different from each other.

The applicant has surprisingly found that the heat transfer fluid employed in the method of the invention is non-flammable, provides efficient heat transfer, can be used across a wide temperature range and has equal or improved dielectric properties with respect to other hydrofluoroethers commercialized as heat transfer fluids. Surprisingly heat transfer fluids used in the invention have an extremely low $GWP_{100}$, in general lower than 10 and for some materials even lower than 2, as it will be shown below in the experimental section. This is a particularly unexpected result and in fact previous reviews such as Hodnebrog et. al. cited above did not investigate or propose fluorinated aromatic ether compounds as low GWP compounds.

Therefore, using these selected chemical compounds in accordance to the general formula (I) heat transfer fluids can be formulated which have a $GWP_{100}$ value of less than 30, preferably less than 10, even more preferably less than 5. The heat transfer fluids according to the invention also have low toxicity, exist in liquid state in a broad range from about −100° C. to about 200° C. showing good heat transfer properties and relatively low viscosity across the whole range. Also, the fluids of the invention have good electrical compatibility, i.e. they are non corrosive, have high dielectric strength, high volume resistivity and low solvency for polar material. The electrical properties of the fluids of the invention are such that they can be used in immersion cooling system for electronics in direct contact with the circuits as well as in indirect contact applications using loops and/or conductive plates.

Another important factor to consider is that heat transfer systems for batteries, while varying greatly in design and in the way the heat transfer fluid is distributed, in general require a heat transfer fluid which must exchange heat with the battery and which is then pumped and recirculated to a heat exchanger, external to the system which controls the temperature of the heat transfer fluid. Numerous parameters influence the capacity of a fluid to exchange heat. It has been found that using heat transfer fluids which have a Prandtl number between 3 and 100 at 40° C. and 1 atm (101325 Pa) pressure allow to obtain optimum performance and energy efficiency of the system. Preferably heat transfer fluids to be employed in the method of the invention have a Prandtl number from 20-90, more preferably 30-80 and an even more preferably 40-70 at 40° C. and 1 atm pressure.

The Prandtl number (Pr) is a dimensionless number defined as:

$$Pr = \frac{c_p\ \mu}{k}$$

where:

$c_p$=specific heat J/kg*K $\mu$=dynamic viscosity N*s/$m^2$ k=Thermal conductivity W/mK The Prandtl number indicates for a given fluid in given temperature (T) and pressure (P) conditions what is the predominant phenomenon among heat conduction and heat convection. A Prandtl number lower than 1 indicates that conduction is more significant than convection while a Prandtl number higher than 1 indicates that convection is more significant than conduction. The Prandtl number if commonly found in the property tables of heat transfer fluids provided by the fluid manufacturers.

Preferably, compounds according to the general formula (I) for the present invention have a value of x selected from 1, 2, 3 or 4, more preferably x is selected from 2 and 3, even more preferably x=2. Each $R_f$ has preferably a $C_1$-$C_{10}$, more preferably a $C_2$-$C_6$ carbon chain which can be linear or comprise branches and/or cycles. The carbon chain may optionally include in chain heteroatoms selected from O, N or S, in case in chain heteroatoms are present it is preferred that the heteroatom is O.

As mentioned above each $R_f$ group must comprise at least one C—F bond. Preferably each $R_f$ group also comprises at least one C—H bond. More preferably each $R_f$ is a fluorinated alkyl group with one single C—H bond, even more preferably wherein said single C—H bond is on the carbon atom in position 2 of the carbon chain.

Of the six C atoms of the Ph ring, x are bonded to —$OR_f$ groups and (6-x) can be bonded to any type of substituents, preferably they are bonded to H atoms or to F atoms, more preferably H atoms.

Compounds according to the formula (I) for use in the method of the invention can be easily prepared by reacting mono or polyhydric phenols with fluorinated olefins, preferably fully fluorinated olefins. The Ph-OH group adds to the double C═C bond and the H atom adds on the C atom in position 2. The resulting compound is a thus hydrofluoroether. This hydrofluoroether can be further fluorinated to a perfluoroether, but preferably is used as a hydrofluoroether, as already mentioned above.

Preferred mono and polyhydric phenols for use herein are phenol, hydroquinone, resorcinol and catechol. Preferred fluorinated olefins for use herein are tetrafluoroethylene, hexafluoropropylene and perfluorovinylethers such as perfluoromethylvinylether, perfluoroethylvinylether and perfluoropropylvinylether.

Most preferred compounds among those encompassed by the general formula mentioned above are:

1,4-bis(1,1,2,2-tetrafluoroethoxy)benzene of formula:

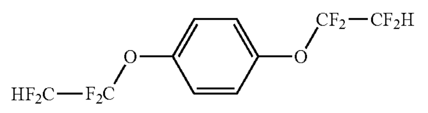

1,4-bis(2-trifluoromethyl-1,1,2-trifluoroethoxy)benzene of formula:

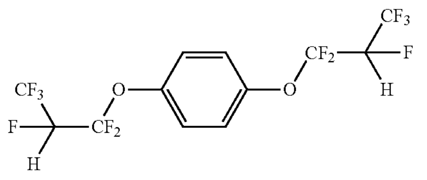

and their corresponding ortho and meta isomers
1,3-bis(1,1,2,2-tetrafluoroethoxy)benzene
1,3-bis(2-trifluoromethyl-1,1,2-trifluoroethoxy)benzene
1,2-bis(1,1,2,2-tetrafluoroethoxy)benzene
1,2-bis(2-trifluoromethyl-1,1,2-trifluoroethoxy)benzene, and the corresponding derivatives of perfluoromethylvinylether with catechol, resorcinol and hydroquinone:
1,2-bis(2-trifluoromethoxy-1,1,2-trifluoroethoxy)benzene
1,3-bis(2-trifluoromethoxy-1,1,2-trifluoroethoxy)benzene
1,4-bis(2-trifluoromethoxy-1,1,2-trifluoroethoxy)benzene The heat transfer fluids for use in the method of invention preferably comprise more than 5% of one or more compounds according to formula (I) above, more preferably more than 50%, even more preferably more than 90%. In one embodiment the heat transfer fluid is entirely made of one or more compounds according to the general formula above.

In some embodiments the heat transfer fluid of the invention comprises a blend of chemical compounds according to formula (I). A blend may be beneficial in providing a fluid which is liquid in a larger temperature range. A preferred blend is a blend comprising at least two different isomers having the same substituents in different positions of the aromatic ring.

In all embodiments it is preferred that the heat exchange fluid is essentially free of CFCs and fluoroalkanes such as 1,1,1,2-tetrafluoroethane, 1,1-difluoromethane, 1,1,1,2,2, pentafluoroethane. These materials have a high $GWP_{100}$ and even in minor amount contribute to the $GWP_{100}$ of the heat exchange fluid more than its main components according to formula (I).

For "essentially free" it is intended that the heat exchange fluid in the present invention comprises less than 5%, preferably less than 1%, more preferably less than 0.1% of a given component (all percentages are expressed as weight percent of the total of the heat exchange fluid).

The method of the invention can then be applied to any battery requiring a thermal management system. Applications of particular interest are vehicle batteries such as cars, trains, trams, aircrafts and the like. As mentioned the method of the invention can also be applied to any type of battery technology, including rechargeable batteries and non rechargeable batteries. The method is particularly beneficial to rechargeable batteries, in particular Li-ion batteries.

In another aspect the present invention also relates to an apparatus comprising a battery, preferably a rechargeable battery, a thermal management system for said battery, said thermal management system for said battery comprising a heat transfer fluid exchanging heat with said battery, wherein said heat transfer fluid comprises one or more chemical compounds having the general formula:

 (I)

wherein Ph is an aromatic ring linked to one or more ether groups —ORf where each —Rf:

is a monovalent fluorinated alkyl group comprising at least one C—F bond, has a carbon chain, preferably a C1-C10 carbon chain, which can be linear or can comprise branches and/or cycles, and, optionally, can comprise in chain heteroatoms selected from O, N or S, and wherein, when X>1, the —Rf groups on the same molecule can be equal to or different from each other.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials Used

Hydroquinone, KOH, acetonitrile were all sourced from Sigma Aldrich Tetrafluoroethylene was sourced from Solvay. Novec™ 7000, 7100 and 7200 are commercially available hydrofluoroethers from 3M Standards:

Measurement of electrical properties were performed according to the following standards:

Volume resistivity—ASTM D5682-08[2012]
Dielectric strength—ASTM D877/D877M-13
Dielectric constant—ASTM D924-15

EXAMPLES

Synthesis of 1,4-Bis(1,1,2,2-tetrafluoroethoxy)benzene (HFE 1,4)

In a 600 mL steel autoclave were loaded 60.0 g of hydroquinone, with 16 g of KOH and 360 mL of acetonitrile. The autoclave was purged four times with nitrogen and drawn to moderate vacuum (0.2 bar).

The mixture was stirred vigorously for 30 minutes at 70° C., then tetrafluoroethylene was introduced gradually up to 10 bar in 6 hours.

The reactor was left stirring for a total of 20 h, then it was cooled and tetrafluoroethylene pressure was released. Its content was then purged four times with nitrogen. Consumption of tetrafluoroethylene was 110 g. 468 g of mixture were unloaded from reactor. This mixture was diluted in a separator funnel with 1.5 L water and neutralized with hydrochloric acid.

The organic layer at the bottom was washed two times with 0.5 L of water and then finally separated from the top water layer, dried over $MgSO_4$, filtered and distilled at 94° C. at a reduced pressure of 15 mbar. 150 g of pure 1,4-bis (1,1,2,2-tetrafluoroethoxy)benzene were obtained.

The $GWP_{100}$ for HFE1,4 has been determined at the University of Oslo according to established procedures, by measuring the integrated absorption cross section of infrared spectra over the region 3500-500 $cm^{-1}$, the kinetic of reaction with OH radicals, and calculating the consequent atmospheric lifetime and radiative forcing efficiency. As a result of these measurements a $GWP_{100}$ of 1.8 has been obtained.

HFE1,4 data relevant to $GWP_{100}$:

Integrated absorption cross section at 3500-500 $cm^{-1}$: 53.6 $cm^2$ $molecule^{-1}$ $cm^{-1}$ Radiative forcing efficiency (calc)=0.165 W $m^{-2}$ OH radicals kinetic $k_{HFE1,4+OH}=2\times10^{-13}$ $cm^3$ $molecule^{-1}$ $s^{-1}$ at 298K Atmospheric lifetime of HFE1,4=2 months $GWP_{100}$=1.8

Electric and thermal properties of HFE1,4 in comparison with other commercially available hydrofluoroethers:

| | $GWP_{100}$ | Volume resistivity (ohm cm−1) | Dielectric strength (kV) | Dielectric constant |
|---|---|---|---|---|
| NOVEC 7200 | 70 | 1.00E+08 | 30 | 7.3 |
| NOVEC 7000 | 530 | 1.00E+08 | 40 | 7.4 |
| HFE1,4 | 1.8 | 2.00E+9 | 45 | 6.2 |

Other physical properties of compounds according to the invention:

1,4-Bis(1,1,2,2-tetrafluoroethoxy)benzene (HFE 1,4)

1,3-Bis(1,1,2,2-tetrafluoroethoxy)benzene (HFE 1,3)

1,2-Bis(1,1,2,2-tetrafluoroethoxy)benzene (HFE 1,2)

| | HFE1,4 | HFE1,3 | HFE1,2 |
|---|---|---|---|
| Dielectric constant @1 kHz | 6.2 | 7.84 | |
| Dielectric strength kV | 45 | | |
| Volume resistivity Ohm*cm | 2E+09 | 1E+10 | |
| heat capacity cal/g° C., | 0.34 | | |
| viscosity (25° C.) cSt, | 3.56 | 2.75 | 2.86 |
| density (25° C.) g/cm3, | 1.5 | 1.5 | 1.5 |
| heat of vaporization kcal/kg, | 34 | | |
| surface tension mN/m, | 28 | | |
| pour point ° C. | −10 | −93 | −87 |
| Boiling point ° C. | 202 | 192 | 206 |

The results show how the compounds of the invention have overall equal or improved properties when compared with existing commercial fluids used for similar purposes and have lower GWP. Heat transfer fluids comprising these compounds can be used in the method of the invention which can then be applied to any battery system requiring a thermal management system. The selected chemical compounds, due to their dielectric properties can be put directly in contact with the battery cells and their electronics. However the method of the invention can also be applied in BTMSs where the fluid is in a closed system which is in thermal contact with the battery via a thermally conductive element.

The invention claimed is:

1. A method comprising exchanging heat between a battery and a heat transfer fluid, said heat transfer fluid comprising more than 30 wt % of one or more chemical compounds selected from:

1,4-bis(1,1,2,2-tetrafluoroethoxy)benzene, 1,4-bis(2-trifluoromethyl-1,1,2-trifluoroethoxy)benzene, 1,3-bis(1,1,2,2-tetrafluoroethoxy)benzene, 1,3-bis(2-trifluoromethyl-1,1,2-trifluoroethoxy)benzene, 1,2-bis(1,1,2,2-tetrafluoroethoxy)benzene, 1,2-bis(2-trifluoromethyl-1,1,2-trifluoroethoxy)benzene, 1,2-bis(2-trifluoromethoxy-1,1,2-trifluoroethoxy)benzene, 1,3-bis(2-trifluoromethoxy-1,1,2-trifluoroethoxy)benzene, 1,4-bis(2-trifluoromethoxy-1,1,2-trifluoroethoxy)benzene, and mixtures thereof, wherein said heat transfer fluid has a $GWP_{100}$ of less than 30.

2. The method according to claim 1 wherein said battery is a vehicle battery.

3. The method according to claim 1 wherein said battery is a rechargeable battery.

4. The method according to claim 3 wherein said battery is a lithium-ion battery.

5. The method according to claim 1 wherein said one or more chemical compounds make up at least 50% by weight of said heat transfer fluid.

6. The method of claim 1, wherein the heat transfer fluid is a dielectric heat transfer fluid within a closed system which is in thermal contact with the battery to indirectly exchange heat or the dielectric heat transfer fluid exchanges heat directly with the battery.

7. The method of claim 6, wherein the dielectric heat transfer fluid is characterized by improved dielectric strength and volume resistivity when compared to heat transfer fluids that do not comprise the one or more compounds.

8. The method of claim 6, wherein the dielectric heat transfer fluid is essentially free of CFCs and fluoroalkanes.

9. The method of claim 1, wherein the heat transfer fluid exists in a liquid state at temperatures ranging from −100 to 200 deg C.

10. The method of claim 1, wherein exchanging heat between the battery and the heat transfer fluid comprises circulating the heat transfer fluid via pump within a closed system in thermal contact with the battery and a second system.

11. The method of claim 10, wherein the second system is a heat exchanger.

12. The method of claim 10, wherein the second system comprises a heating system and/or a refrigeration system.

13. The method of claim 1, wherein the heat transfer fluid has a Prandtl number between 3 and 100 at 40° C. and 1 atm (101325 Pa) pressure.

14. The method of claim 13, wherein the heat transfer fluid has a Prandtl number between 30 and 80 at 40° C. and 1 atm pressure.

15. The method of claim 14, wherein the heat transfer fluid has a Prandtl number between 40 and 70 at 40° C. and 1 atm pressure.

* * * * *